(12) United States Patent
Lange et al.

(10) Patent No.: US 7,364,347 B2
(45) Date of Patent: Apr. 29, 2008

(54) FLUIDISING APPARATUS

(75) Inventors: Neville Ernest Lange, Gloucester (GB); Geoffrey John Christopher Childs, Truro (GB)

(73) Assignee: Axsia Serck Baker Limited, Gloucester (GB)

( * ) Notice: Subject to any disclaimer, the term of this patent is extended or adjusted under 35 U.S.C. 154(b) by 494 days.

(21) Appl. No.: 10/525,773

(22) PCT Filed: Jun. 24, 2003

(86) PCT No.: PCT/GB03/02693

§ 371 (c)(1),
(2), (4) Date: Feb. 28, 2005

(87) PCT Pub. No.: WO2004/020318

PCT Pub. Date: Mar. 11, 2004

(65) Prior Publication Data

US 2005/0260043 A1    Nov. 24, 2005

(30) Foreign Application Priority Data

Aug. 31, 2002  (GB) ................. 0220256.2

(51) Int. Cl.
*B65G 53/00* (2006.01)
*B01F 15/02* (2006.01)

(52) U.S. Cl. ................. 366/101; 366/184; 422/145; 406/137

(58) Field of Classification Search ........... 366/106, 366/107, 184, 174.1, 101; 422/145, 139; 406/93, 136, 137
See application file for complete search history.

(56) References Cited

U.S. PATENT DOCUMENTS

| 2,613,922 | A | * | 10/1952 | Gatchet ............ 366/167.1 |
| 3,178,233 | A | | 4/1965 | Bredthauer |
| 3,360,301 | A | | 12/1967 | Donaho, Jr. |
| 3,430,925 | A | * | 3/1969 | Buhner ............ 366/172.2 |
| 3,776,385 | A | * | 12/1973 | Maciula et al. ....... 210/304 |
| 3,807,705 | A | * | 4/1974 | Humkey et al. ........ 366/101 |
| 3,868,226 | A | * | 2/1975 | Thompson ............ 422/145 |
| 4,736,895 | A | * | 4/1988 | Huttlin .............. 366/101 |
| 4,978,251 | A | | 12/1990 | Drobadenko et al. |
| 5,637,278 | A | | 6/1997 | Smith et al. |
| 5,765,945 | A | * | 6/1998 | Palmer ............ 366/167.1 |
| 2005/0260043 | A1 | * | 11/2005 | Lange et al. ......... 406/136 |

FOREIGN PATENT DOCUMENTS

| DE | 159169 | 2/1983 |
| GB | 1 348 042 | 3/1974 |
| RU | 2 111 262 | 5/1998 |

* cited by examiner

*Primary Examiner*—Tony G Soohoo
(74) *Attorney, Agent, or Firm*—Young & Thompson

(57) ABSTRACT

A fluidizing apparatus includes a supply duct (1) for supplying liquid under pressure to a lower portion of a vessel (11) containing a fluidizable material. The supply duct (1) extends into the vessel. The outlet end of the apparatus includes one or more jets (212) for directing the flow of liquid into the vessel (11) substantially transversely to the major axis of the supply duct (1). An outlet duct (12) for removing the fluidized material from the vessel (11) is also included.

35 Claims, 6 Drawing Sheets

FLUIDISING APPARATUS

BACKGROUND OF THE INVENTION

1. Field of the Invention

Figure 1:
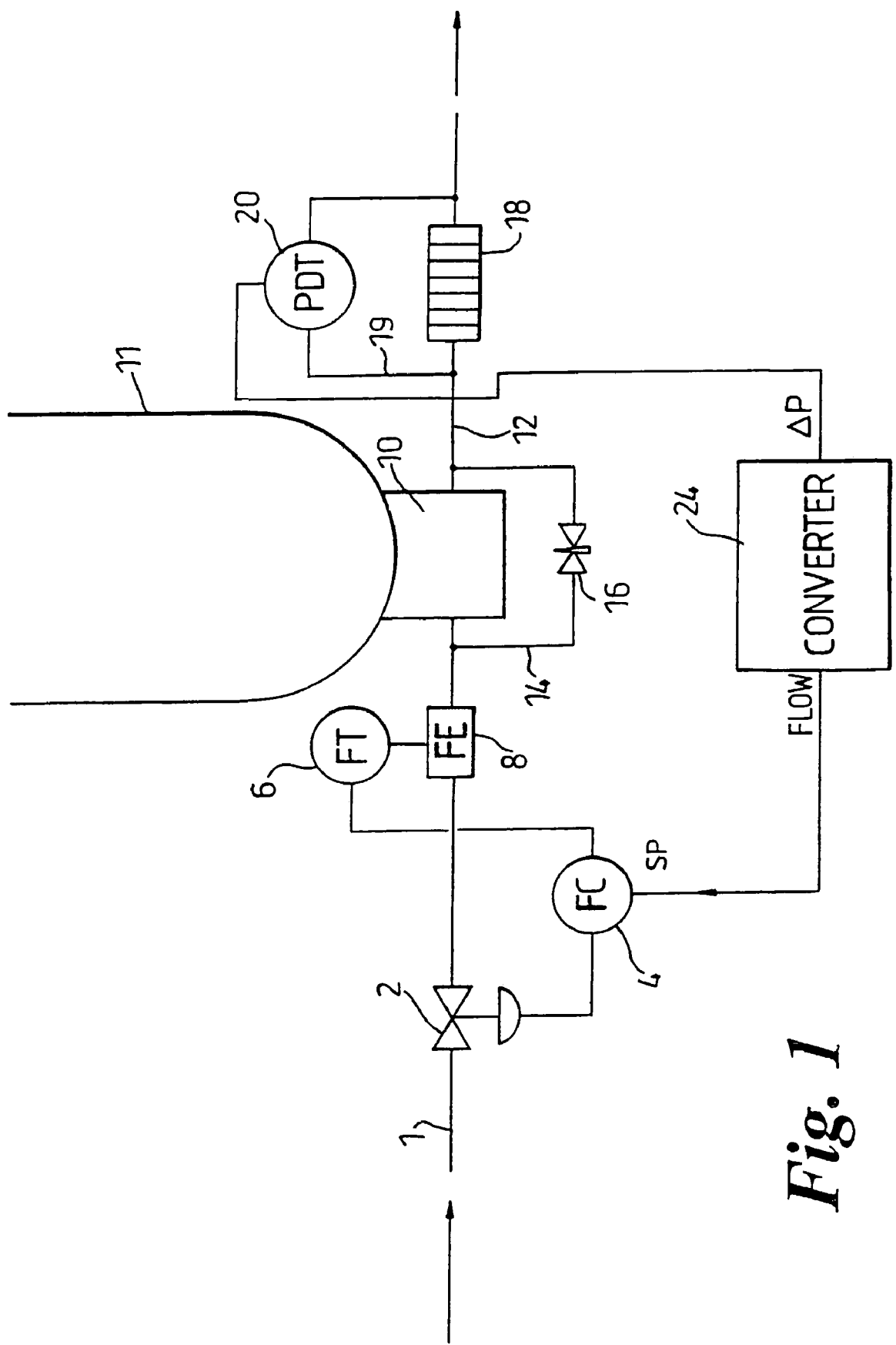

The present invention relates to fluidising apparatus.

2. Description of the Related Art

Fluidisers are known for hydraulic conveyance of loose materials. A typical application of fluidisers is the removal of sand from a vessel. Sand at the base of the vessel tends to be packed substantially solid and is therefore difficult to move. A fluidising apparatus disclosed in U.S. Pat. No. 4,978,251 works by discharging a liquid under pressure into a sand containing vessel. The pressurised liquid emerges in a downward annular flow which creates a vortex within an adjacent region of the vessel (known as the "radius of influence"). The liquid mixes with the sand and fluidises it to form a slurry. The slurry can then enter a discharge pipe for conveyance to a remote location.

Unfortunately, there are several problems associated with such conventional fluidisers. First, such fluidisers are fitted inside the vessel. This makes maintenance access difficult and can interfere with other internal components inside the vessel. Furthermore, the pipes supplying the pressurised liquid and the pipe discharging the slurry are arranged so that they are concentric along a significant portion of their lengths. Therefore, if one of the pipes is damaged or becomes blocked then a significant amount of work and disruption is involved in fixing the problem. The swirling water emerging from the discharge pipe is also at risk of returning into the device. Another disadvantage is that the "radius of influence" of conventional fluidisers is relatively limited in directions radial to the water supply pipe. Conventional fluidisers require two pipes to penetrate the vessel and mate up to it, and these can be difficult to fit.

U.S. Pat. No. 5,637,278 discloses a fluidiser of a similar design to that of U.S. Pat. No. 4,978,251, but protruding upwards into the base of a vessel. When such apparatus is being used in a vessel in which gravity separation of oil and water is taking place, the vortex it creates causes a disturbance that extends a considerable distance into the vessel. This can disturb the gravity separation and the water and the oil may become mixed together again. The vortex can also draw oil into the apparatus so that oil is discharged in the slurry. If this happens then the oil will usually have to be separated from the slurry to avoid pollution and monetary loss.

U.S. Pat. No. 3,178,233 shows a fluidising arrangement for a chamber including an inlet pipe which is concentric with and surrounding an outlet duct. A bonnet can be connected so that the inlet jets are located beneath the lower surface of the deflector. GB 1348042 shows an apparatus having a rotatable cylindrical inlet duct with a single nozzle at its upper end. Detection rods are used to determine the level of material in the tank and feedback from the detectors are used to control the speed of rotation.

SUMMARY OF THE INVENTION

According to a first aspect of the present invention there is provided fluidising apparatus including:

a supply duct for supplying liquid under pressure to a lower portion of a vessel containing a fluidisable material, the supply duct extending into the vessel and including at the outlet end thereof one or more jets for directing the flow of liquid into the vessel substantially transversely to the major axis of the supply duct, and an outlet duct for removing the fluidised material from the vessel, wherein the inlet end of the outlet duct is protected from ingress of non-fluidised material by a flange member located between the jets and the inlet end of outlet duct, the flange member adapted to divert the flow of fluidised material past the underside of the flange member before entering the inlet end of the outlet duct.

The flange member may be fitted around a portion of the supply duct located inside the vessel.

The flange member may also assist in directing the fluidised material towards the outlet duct. The diameter of the flange member may be at least equal to an adjacent portion of the diameter of the outlet duct. The flange member may include a groove on its surface facing the outlet duct. The outlet duct may project at least partially into the groove. The distance between the outlet duct and the flange member may be adjustable.

The supply duct and/or outlet duct may be substantially cylindrical. The diameter of the outlet duct may vary along its length. Typically, the upper portion of the outlet duct will be narrower than a lower portion. The fluidiser apparatus may be partially housed within a housing extending down from the base of the vessel. A space may exist between the inner surface of the housing and the outer surface of the outlet duct.

The apparatus may further include a body portion surrounding the supply duct and substantially blocking the outlet duct apart from an aperture through which the fluidised material can pass. The aperture may be located between the outer surface of the supply duct and the inner surface of the outlet duct.

In one embodiment an aperture or bore acting as a bypass between the supply duct and the outlet duct may be present. A valve may be fitted to the bypass aperture or bore.

The supply duct and/or the outlet duct may include an L-shaped portion so that a substantially horizontal pipe(s) may lead to/from the fluidising apparatus for connection with the duct(s).

The supply duct may direct the flow of liquid into the vessel in a plurality of directions substantially radially to the major axis of the supply duct. The outlet end of the supply duct may be fitted with a plurality of nozzles. The nozzles may be arranged at a plurality of vertical tiers. The nozzles may produce a flat spray or fan spray. Alternatively, the outlet end of the supply duct may include a cap having a plurality of radially arranged slots.

The supply duct may remote from the outlet duct. The supply duct may be parallel along part of its length with part of the outlet duct. A portion of the supply duct may extend into the vessel through the base of the vessel. The portion extending into the vessel may have a length shorter than the diameter of the vessel. The apparatus may further include a hydrocyclone, typically adjacent the outlet duct.

According to a second aspect of the invention there is provided a vessel fitted with a fluidiser apparatus substantially as described above.

The vessel may be an open or closed pot. The supply duct may be connected directly to the outlet duct via a valve. The valve can allow the concentration of slurry in the outlet duct to be adjusted.

The outlet duct may pass through a cyclone, preferably a pressure reducing cyclone having a single outlet. The flow rate at the outlet duct may be sensed and the flow rate in the supply duct is controlled accordingly.

According to yet another aspect of the present invention there is provided a method of treating fluidisable material in a vessel, the method including steps of:

supplying liquid under pressure to a vessel, the liquid being emitted into a lower portion of the vessel as one or more jets substantially transverse to the major axis of the supply duct, and removing the fluidised material from the vessel wherein the inlet end of the outlet duct is protected from ingress of non-fluidised material by a flange member adapted to divert the flow of fluidised material past the underside of the flange member before entering the inlet end of the outlet duct.

BRIEF DESCRIPTION OF THE DRAWING FIGURES

Whilst the invention has been described above, it extends to any inventive combination of the features set out above or in the following description.

Figure 2:
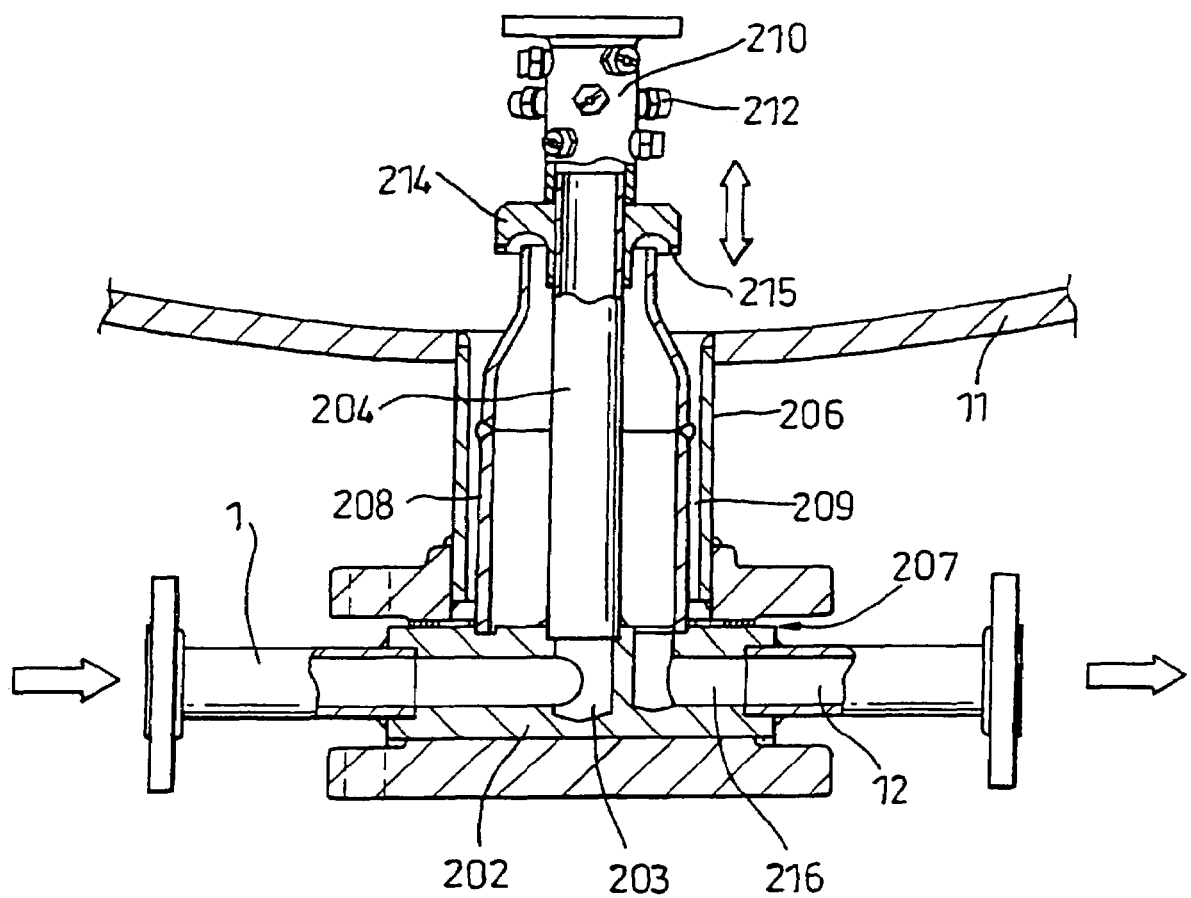

The invention may be performed in various ways, and, by way of example only, embodiments thereof will now be described, reference being made to the accompanying drawings, in which:

FIG. 1 illustrates schematically an open vessel fitted with a fluidiser;

FIG. 2 details a first embodiment of the fluidiser, and

FIGS. 3 to 9 detail alternative embodiments of the fluidiser

DETAILED DESCRIPTION OF THE PREFERRED EMBODIMENTS

Referring to FIG. 1, an inlet pipe 1 leads to a valve 2 which is controlled by a flow controller (FC) 4. The controller 4 is connected to a flow sensor (FT) 6 which is linked to a flow element (FE) 9 fitted on the pipe 1 at a point downstream of the valve 2. The pipe 1 supplies pressurised water to a fluidiser apparatus 10 fitted to the base of a vessel 11. The fluidiser produces a slurry which is discharged through a discharge pipe 12. A pipe 14 branches off the discharge pipe 12 near the fluidiser 10 and leads back to a connection with the inlet pipe 1 at a point near where the pipe 1 enters the fluidiser 10. A valve 16 on the branch pipe 14 is used to control the amount of water (if any) that can pass directly from the inlet pipe 1 into the discharge pipe 12, thereby allowing the slurry concentration in the pipe 12 to be adjusted.

The discharge pipe 12 passes through a cyclone 18. The cyclone 18 is preferably a pressure reducing cyclone similar to the one described in GB 2296106A, which has an inlet but only one outlet. However, it will be understood that a conventional cyclone with two outlets could be used. A pipe 19 branches off the outlet pipe 12 before it enters the cyclone 18. The branch pipe 19 passes through a Pressure Differential Transmitter (PDT) 20 and then links back into the discharge pipe 12 at a point downstream of the cyclone 18. The PDT 20 is connected to a flow converter 24 which is used to regulate the flow controller 4. It will be appreciated that the branch pipe 19, PDT 20 and converter 24 are optional.

The vessel 11 shown in the example of FIG. 1 is an "open pot" where the inflow of liquid through the pipe 1 is not forced to match the outflow of slurry in the discharge pipe 12. An open pot is a vessel that contains gas as well as liquid and therefore allows a net accumulation or discharge of liquid from the vessel by the expansion of compression of the gas, or a vessel with at least one other port which could accommodate a difference in the rates of inflow and outflow. Open vessels are considered "open pot" as they meet both of these criteria. It will be appreciated that the inlet flow control components 2, 4, 6, 8 may not be required where the vessel 11 is a closed pot, as measuring of the slurry flow rate is not required. A closed pot is a vessel wherein the inflow of liquid in the pipe 1 is forced to match the outflow of slurry in the discharge pipe 12. Closed pots do not contain gas in addition to the liquid and do not have any additional ports to accommodate a difference in flow rates. Flow control components as shown in FIG. 1 might be used, but it is more likely that a flow control loop on the inlet water may be used. In the case where the water entering the water inlet pipe 1 and the vessel 11 and the slurry entering the discharge pipe 12 are all at essentially constant pressure, a fixed orifice may be adequate for inlet water flow control.

Turning to FIG. 2, a first embodiment of the fluidiser 10 according to the invention is detailed. The water inlet pipe 1 enters through the side of the curved surface of a substantially cylindrical base block 202. The inlet pipe leads into a horizontal portion of an L-shaped duct 203 formed by cross drillings in the base block. The opening in the vertical portion of the L-shaped duct 203 is connected to a substantially vertical pipe 204 that extends upwards out of the base block 202 and into a lower part of the vessel 11 through a substantially central aperture at the base of the vessel. The vertical pipe 204 is housed within a cylindrical housing 206 that extends from the aperture at the base of the vessel 11 down to the upper surface of the base block 202. A non-asbestos fibre gasket 207 is fitted between the base block 202 and the housing 206.

A check valve may be included in the inlet duct of the apparatus. The valve can be located in the pipe 1; however, it is preferably fitted in the vertical pipe 204 as having it in the apparatus is usually more cost-effective than fitting it into external piping. The valve can help prevent momentary reversals of pressure pushing sand into the jets of the apparatus.

Fitted inside the housing 206 and extending into the base of the vessel 11 is a slurry collection component 208. The collection component 208 is substantially cylindrical and surrounds the vertical supply pipe 204 and is substantially co-axial therewith. An upper portion (about one fifth of its length) of the collection component 208 has a smaller diameter than its remaining lower portion. The side wall of the component 208 tapers to form a substantially frusto-conical shape between the upper narrower portion and the lower wider portion. It is the narrower portion of the collection component 208 that projects into the vessel 11. The length of the vertical pipe 204 is greater than that of the collection component 208 and therefore the pipe 204 projects further into the vessel 11. A space 209 exists between the inner surface of the housing 206 and the outer surface of the collection component 208.

Fitted around a portion of the vertical pipe 204 that extends above the top of the collection component 208 is a flange member 214. The lower surface of the flange member 214 includes an annular groove 215. At least part of the flange member (typically the portion forming the groove 215) can be formed of a hard-wearing material. At least part of the vertical pipe 208 (typically its upper portion) can also be formed of a hard-wearing material, such as Tungsten Carbide. In an alternative embodiment, the annular groove with the domed top profile shown in FIG. 2 is replaced by a ring-shaped groove having a flat top profile. This is intended to allow the gap between the inside of the collection component 208 and the outer surface of the vertical pipe 204 to be increased.

The position of the flange member 214 on the vertical pipe 204 can be adjusted (as shown by the vertical arrows) before or during installation so that the distance between the flange member 214 and the collection component 208 can be varied. Preferably, the minimum distance between the two surfaces is such that the upper end of the collection component 208 projects about half way into the groove 215 (as shown in FIG. 2). The maximum distance may be such that the upper end of the collection component 208 is located slightly below the bottom surface of the flange member 214.

Fitted onto the upper end of the vertical pipe 204 is a nozzle spray head 210. The nozzle spray 210 includes nine Lurmark fan spray nozzles 212 (part no CM10) arranged radially about it at three vertical tiers.

The length of the portion of the apparatus that projects into the vessel 11 is typically around 150 mm. The internal diameter of the vessel that may be used in conjunction with the apparatus may vary between 400 mm and 2500 mm, typically 900 mm to 2500 mm. Thus, the portion of the apparatus that projects into the vessel is normally of a length shorter than the diameter of the vessel. The examples show the apparatus being used in conjunction with a vessel that is vertically oriented; however, it will be understood that the apparatus can also be connected to a vessel that is oriented horizontally. In this case the diameter of the vessel is likely to vary between 1800 mm and 5000 mm, with a length typically between 4 to 8 times its diameter. Although example dimensions have been given above, it will be appreciated that the apparatus can be used with vessels of other sizes.

The base portion 202 includes a second L-shaped duct 216. The opening at the vertical portion of the duct 216 is located between the outer surface of the vertical pipe 204 and the inner surface of the collection component 208. One end of the discharge pipe 12 is connected to the opening at the horizontal portion of the L-shaped duct 216.

In use, the pressurised liquid enters via the inlet pipe 1 and passes through the L-shaped piece 203 and up into the vertical pipe 204. The water is ejected as a plurality of separate jets in directions substantially radial to the major axis of the pipe 204 into the vessel 11. The ejected water mixes with the sand in the surrounding portion of the vessel, loosening it and creating a slurry. The slurry is moved by pressure in the vessel and, to a lesser extent, by gravity downwards towards the base of the vessel. Sand will have normally settled in the space 209 and most of this will not be fluidised. Pressure forces the slurry to slide along the outer upper surface of the collection component 208, pushing it towards the lower surface of the flange member 214. The slurry is guided by the grooved surface 215 into the collection component 208, where it enters the L-shaped duct 216 and passes into the discharge pipe 12. The flange member 214 also helps prevent fluidised material from entering the space 209 between the collection component 208 and the vertical pipe 204 when the material is not being drawn out of the vessel.

Figure 3:
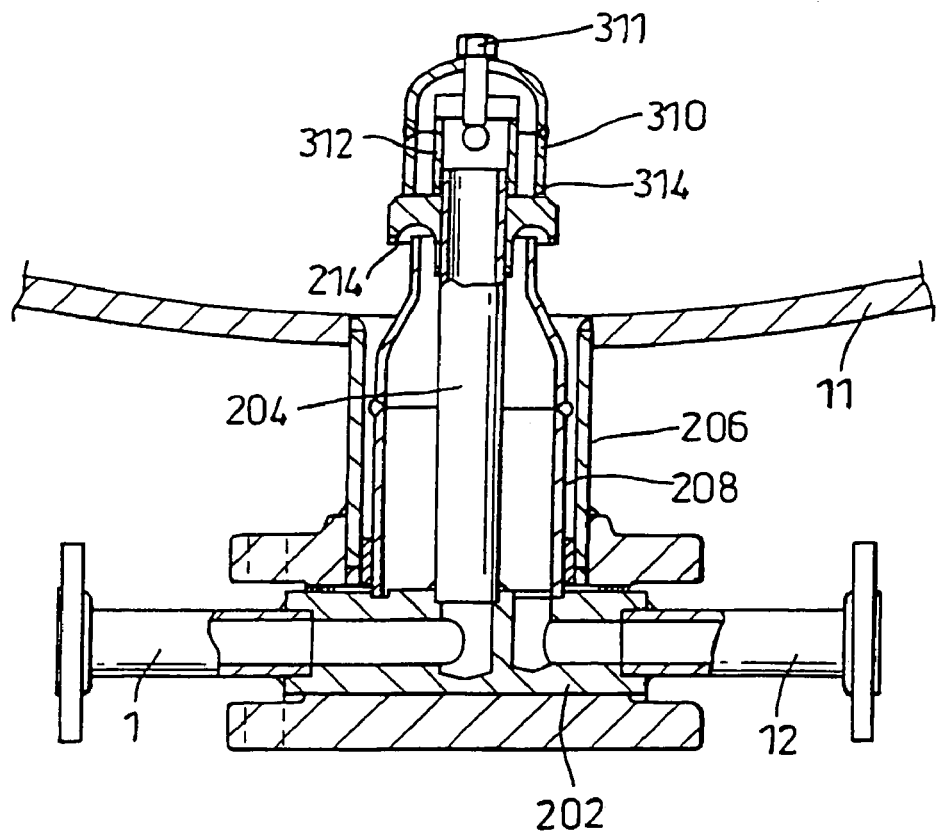

Turning to FIG. 3, there is shown an alternative embodiment of the fluidiser 10. Components substantially identical to those of the embodiment of FIG. 2 are given identical reference numbers. In the embodiment of FIG. 3, the upper end of the vertical pipe 204 is housed within a domed cap 310 instead of being fitted with the nozzle head spray 210. The base of the dome 310 rests on the upper surface of the flange member 214 and a bolt 311 projects through the top of the dome into a stop 312 fitted in the upper end of the vertical pipe 204. The stop 312 includes a plurality of radial holes that allow water to pass from the interior of the vertical pipe 204 to the interior of the cap 310. Spray slots 314 are provided radially around the circumference of the cap 310.

Figure 4:
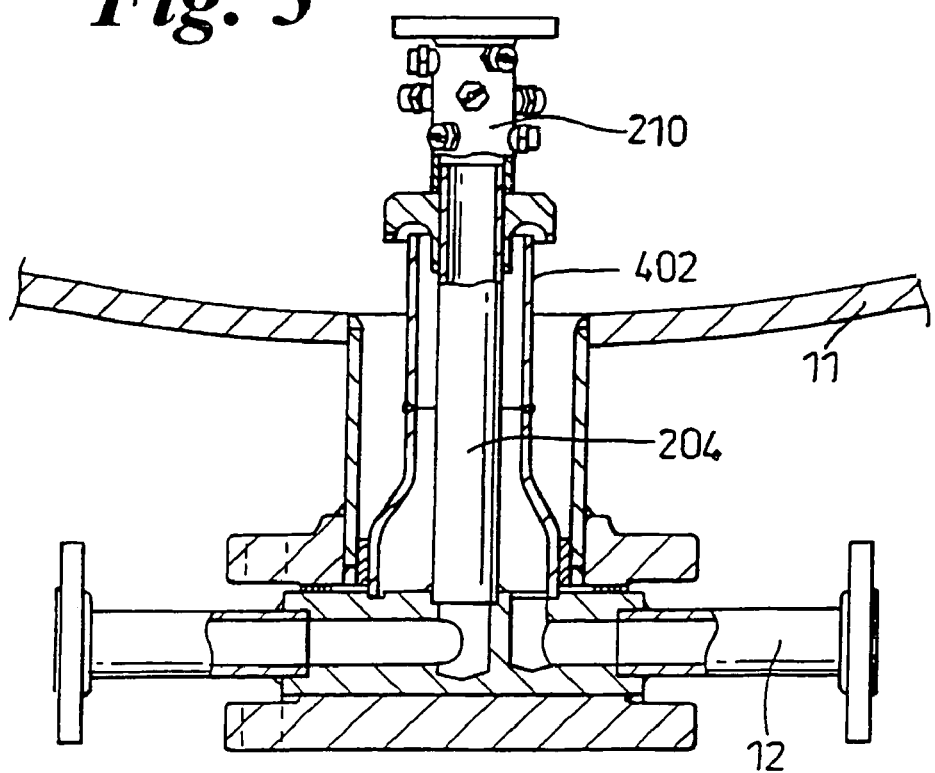

The embodiment of FIG. 4 is substantially identical to that of FIG. 2 except that the collection component 208 is replaced by collection component 402. The collection component 402 is also substantially cylindrical but its upper portion (about two-thirds of its length) has a relatively small diameter and tapers outwards to a lower remaining portion of a greater diameter. Therefore, the space 209 between the outer walls of the component 402 and the inner walls of the housing 206 is greater in volume than in the embodiment of FIG. 2.

Figure 5:
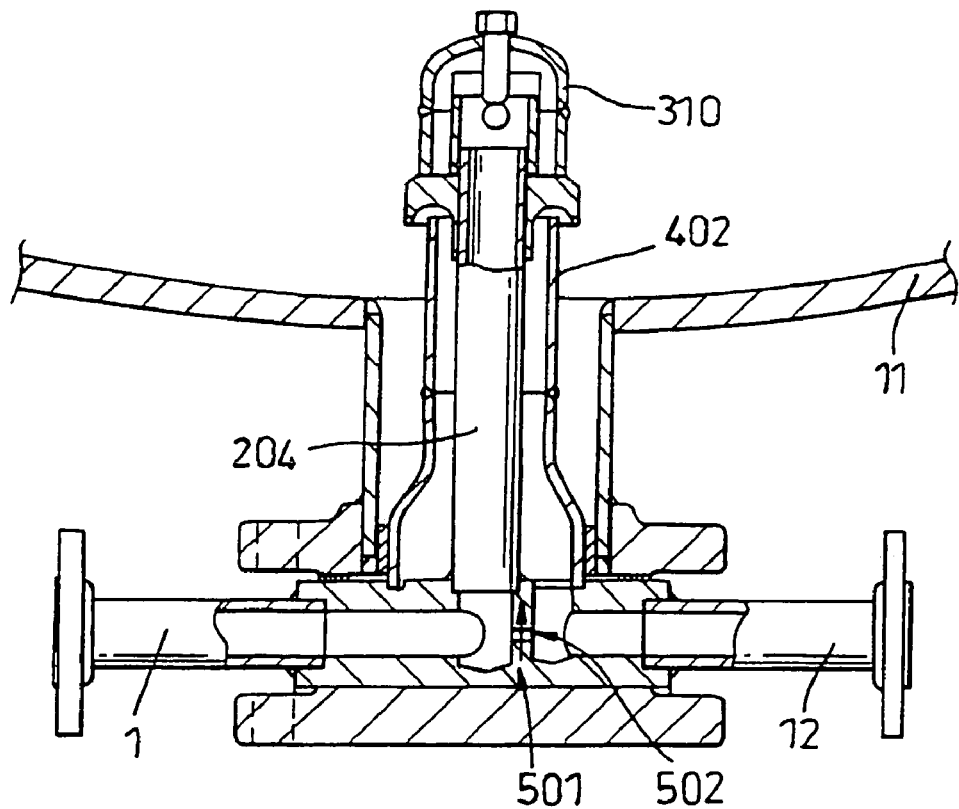

The embodiment of FIG. 5 is a combination of the embodiments of FIGS. 3 and 4, i.e. the slotted domed cap 310 is used along with the collection component 402. An optional bore 501 is also shown in FIG. 5. The bore 501 is a hole drilled between the inlet L-shaped duct 203 and the outlet L-shaped duct 216. The bore 501 acts as an internal bypass which can eliminate the need for the valve 16 of FIG. 1 and its associated pipework 14. If an adjustable internal bypass is required then a valve 502 can be fitted to the bore 501. It will be appreciated that the bypass bore and/or valve could be used in any of the embodiments shown.

The embodiments of FIGS. 3 and 5 have jets located closer to the bottom of the vessel than the embodiments of FIGS. 2 and 4 and so can produce a dense slurry at a lower sand level in the vessel. The domed caps 310 of the embodiments of FIGS. 3 and 5 do not project as far into the bottom of the vessel as the nozzle head spray 210 and so can be used when the withdrawal space beneath the vessel is limited. The embodiments of FIGS. 3 and 5 are also less susceptible to sand ingress into the components forming the jets than the embodiments of FIGS. 2 and 4 and they can also be dismantled for cleaning more easily.

The "low waisted" collection component 402 can reduce the volume of sand that settles in the space between the vertical pipe 204 and the component 402 if the flow of slurry is stopped before complete discharge. The collection components 402 are also easier to remove from the vessel nozzle than the component 208 because settled sand is less inclined to bridge the gap between the housing 206 and the component 402 and jam the component 402.

Figure 6:
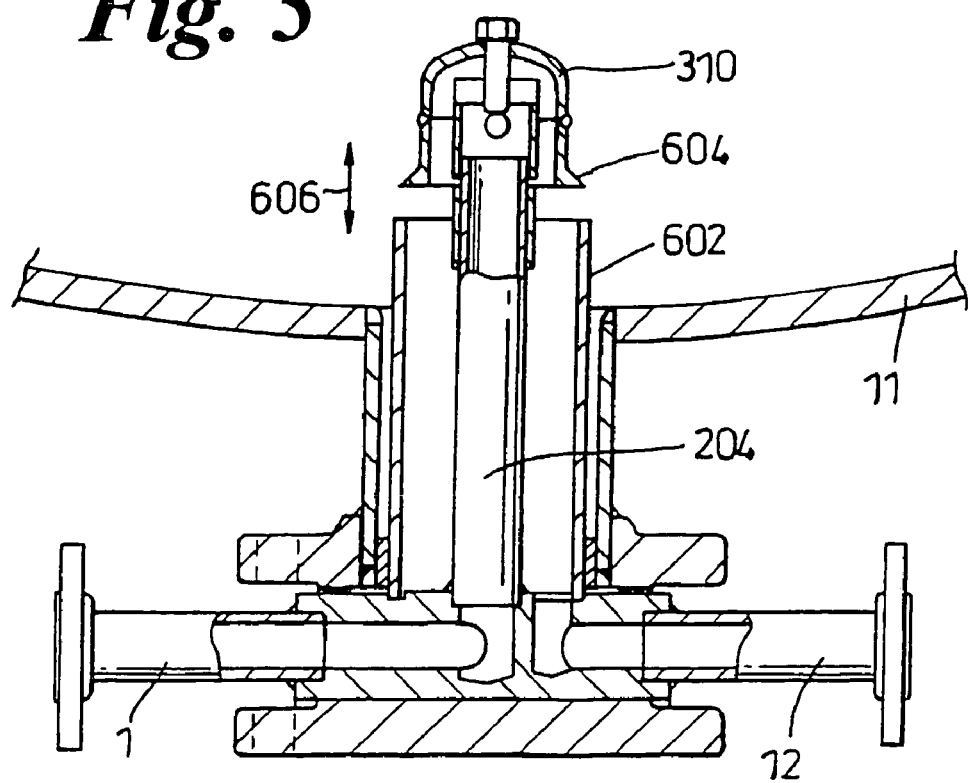

The embodiment of FIG. 6 is similar to that of FIG. 3 but differs in two main ways. First, the collection component 208 is replaced by a collection component 602 which is a regular cylinder. Second, the flange member 214 is replaced by a flange member 604 which is substantially frustro-conical in shape and depends from the lower surface of the domed cap 310 instead of being fitted around the vertical pipe 204. The flange 604 directs the jets of water in more generally downwards directions than the other nozzles/slots. A gap 606 exists between the lower end of the flange 602 and the upper end of the collection component 602.

Figure 7:
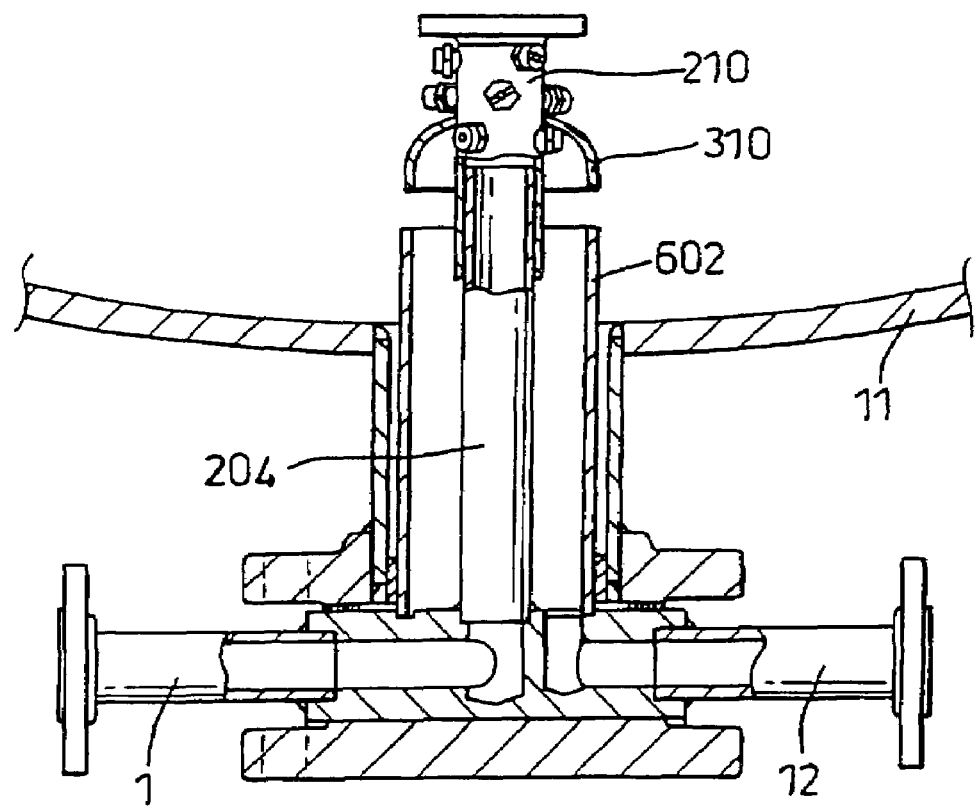
Figure 8:
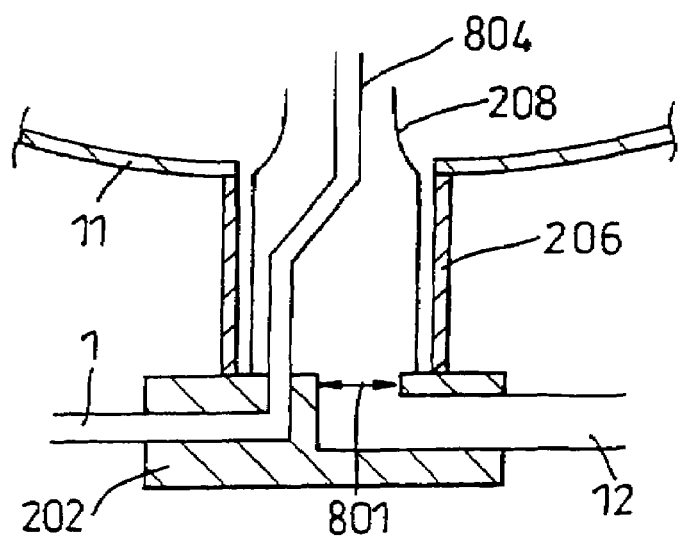
Figure 9:
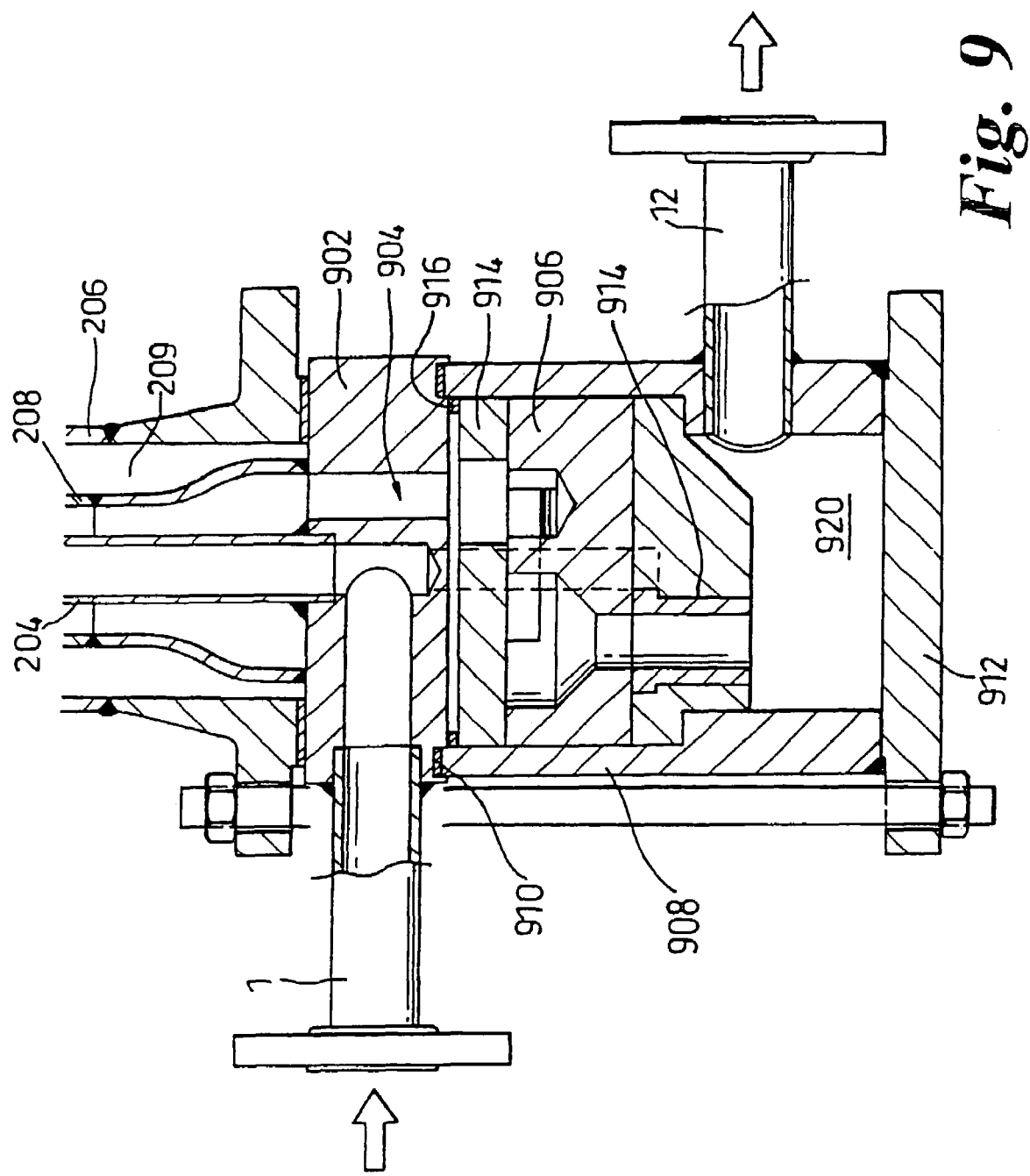

The embodiment of FIG. 7 is substantially similar to that of FIG. 6 except that the nozzle spray head 210 is fitted onto the end of the vertical pipe 204 instead of the stop 312. Some of the nozzles of the spray head 210 are located above the upper surface of the cap 312, whilst other nozzles are located within the domed cap 310. The water ejected through the nozzles within the cap 310 produces jets directed in generally downwards directions. The jets produced by the embodiments of FIGS. 6 and 7 are intended to fluidise any sand settled within the collection component 602.

It will be appreciated that that different configurations of supply and collection components can be employed. For example, the collection component could be a separate tube remote from the supply pipe and it does not need to be co-axial or parallel with it. In the alternative embodiment shown in FIG. 8, a supply pipe 804 is positioned within the collection component 208, but the supply pipe 804 is angled so that it is offset near its lower end towards one side of the collection component 208. This allows a larger opening 801 to be present in the top of the base block 202 so that a wider discharge pipe can be used if required.

A hydrocyclone may be fitted within the apparatus rather than being external to it (such as the external hydrocyclone 18 of FIG. 1). This can be easier to install and therefore cheaper than having an external hydrocyclone. In the embodiment shown in FIG. 9 the base block 902 of the fluidiser includes a bore 904 that acts as a conduit between the space 209 and the inlet of a hydrocyclone 906. The hydrocyclone 906 is located within a cylindrical sleeve 908 that is fitted using a CAF gasket 910 to the bottom of the base unit 902. The base of the sleeve 908 is covered by a disc 912. A wear plate 914 is fitted by means of an o-seal 916 between the lower surface of the base 902 and the top of the hydrocyclone 906. A wear liner 918 is fitted to the lower surface of the hydrocyclone. The liner 918 includes a bore through which slurry that has passed through the hydrocyclone can enter a space 920 in the bottom of the sleeve 908. The slurry can then flow through an outlet 12 located at the side of the space 920.

The embodiments described above can produce a "radius of influence" (i.e. affects an adjacent region of the vessel) of up to about 750 mm, and so the fluidising operation can be more effective. Tests have shown that this can clear sand from a diameter of about 1500 mm around the housing through which the nozzle of the apparatus projects.

The invention claimed is:

1. A fluidising apparatus comprising:
    a supply duct (1) for supplying liquid under pressure to a lower portion of a vessel (11) containing a fluidisable material, the supply duct extending into the vessel and including at the outlet end thereof one or more jets (212) for directing the flow of liquid into the vessel substantially transversely to the major axis of the supply duct, and
    an outlet duct (12) for removing the fluidised material from the vessel, wherein the inlet end of the outlet duct (12) is protected from ingress of non-fluidised material by a flange member (214) located between the jets and the inlet end of outlet duct, the flange member adapted to divert the flow of fluidised material past the underside of the flange member before entering the inlet end of the outlet duct.

2. The apparatus according to claim 1, wherein the outlet duct (12) surrounds the outlet end of the supply duct (1) and is substantially co-axial therewith.

3. The apparatus according to claim 1, wherein the flange member (214) is fitted around a portion (204) of the supply duct that extends into the vessel (11).

4. The apparatus according to claim 1, wherein the flange member (214) also assists in directing the fluidised material towards the outlet duct (12).

5. The apparatus according to claim 1, wherein the diameter of the flange member (214) is at least equal to the diameter of an adjacent portion of the outlet duct (208).

6. The apparatus according to claim 1, wherein the distance between the outlet duct (208) and the flange member (214) is adjustable.

7. The apparatus according to claim 1, wherein the supply duct (1) and/or the outlet duct (12) is substantially cylindrical.

8. The apparatus according to claim 7, wherein the diameter of the outlet duct (208) varies along its length.

9. The apparatus according to claim 8, wherein an upper portion of the outlet duct (208) is narrower than a lower portion.

10. The apparatus according to claim 7, further including a body portion (202) surrounding the supply duct (204) and substantially blocking the outlet duct (208) apart from an aperture through which the fluidised material can pass.

11. The apparatus according to claim 1, wherein the fluidiser apparatus is partially housed within a housing (206) extending down from the base of the vessel (11).

12. The apparatus according to claim 11, wherein a space (209) exists between the inner surface of the housing (206) and the outer surface of the outlet duct (208).

13. The apparatus according to claim 1, further including an aperture or bore (501) acting as a bypass between the supply duct (204) and the outlet duct (208).

14. The apparatus according to claim 13, wherein a valve (502) is fitted to the bypass aperture or bore (501).

15. The apparatus according to claim 1, wherein the supply duct includes an L-shaped portion (203) and is connected to a substantially horizontal pipe (1) leading to the fluidising apparatus.

16. The apparatus according to claim 1, wherein the outlet duct includes an L-shaped portion (216) leading to a substantially horizontal pipe (12) leading away from the fluidising apparatus.

17. The apparatus according to claim 1, wherein the supply duct (204) directs the flow of liquid into the vessel (11) in a plurality of directions substantially radially to the major axis of the supply duct.

18. The apparatus according to claim 17, wherein the outlet end of the supply duct includes a cap (310) having a plurality of radially arranged slots (314).

19. The apparatus according to claim 1, wherein the supply duct (1) is remote from the outlet duct (12).

20. The apparatus according to claim 1, wherein the supply duct (1) is parallel along part of its length with part of the outlet duct (208).

21. The apparatus according to claim 1, wherein a portion (204) of the supply duct extends into the vessel (11) through the base of the vessel.

22. The apparatus according to claim 21, wherein the portion (204) extending into the vessel (11) has a length shorter than the diameter of the vessel.

23. The apparatus according to claim 1, further including a hydrocyclone adjacent the outlet duct.

24. A vessel (11) fitted with fluidiser apparatus (10) according to claim 1.

25. The vessel according to claim 24, wherein the vessel (11) is an open pot.

26. The vessel according to claim 24, wherein the vessel (11) is a closed pot.

27. The vessel according to claim 26, wherein the outlet duct (12) passes through a pressure-reducing cyclone (18).

28. The vessel according to claim 24, wherein the supply duct (1) is connected directly to the outlet duct (12) via a valve (16).

29. The vessel according to claim 24, wherein a sensor senses the flow rate at the outlet duct (12) and a controller controls the flow rate the liquid in the supply duct (1).

30. A fluidising apparatus comprising:
    a supply duct (1) for supplying liquid under pressure to a lower portion of a vessel (11) containing a fluidisable material, the supply duct extending into the vessel and including at the outlet end thereof one or more jets (212) for directing the flow of liquid into the vessel substantially transversely to the major axis of the supply duct, and an outlet duct (12) for removing the fluidised material from the vessel, wherein the inlet end of the outlet duct (12) is protected from ingress of non-fluidised material by a flange member (214) located between the jets and the inlet end of outlet duct, the flange member adapted to divert the flow of fluidised material past the underside of the flange member before entering the inlet end of the outlet duct, and the flange member (214) includes a groove (215) on its surface that faces the outlet duct (208).

31. The apparatus according to claim 30, wherein the outlet duct (208) projects at least partially into the groove (215).

32. A fluidising apparatus comprising:

a supply duct (1) for supplying liquid under pressure to a lower portion of a vessel (11) containing a fluidisable material, the supply duct extending into the vessel and including at the outlet end thereof one or more jets (212) for directing the flow of liquid into the vessel substantially transversely to the major axis of the supply duct, and an outlet duct (12) for removing the fluidised material from the vessel, wherein the inlet end of the outlet duct (12) is protected from ingress of non-fluidised material by a flange member (214) located between the jets and the inlet end of outlet duct, the flange member adapted to divert the flow of fluidised material past the underside of the flange member before entering the inlet end of the outlet duct, the supply duct (204) directs the flow of liquid into the vessel (11) in a plurality of directions substantially radially to the major axis of the supply duct, and the outlet end of the supply duct is fitted with a plurality of nozzles (212) arranged radially therearound.

33. The apparatus according to claim 32, wherein the nozzles are arranged in a plurality of vertical tiers.

34. The apparatus according to claim 32, wherein the nozzles produce a fan spray.

35. A method of treating fluidisable material in a vessel, the method including steps of:

supplying liquid under pressure to a vessel, the liquid being emitted into a lower portion of the vessel as one or more jets substantially transverse to the major axis of the supply duct, and removing the fluidised material from the vessel, the method characterised in that the inlet end of the outlet duct (12) is protected from ingress of non-fluidised material by a flange member (214) adapted to divert the flow of fluidised material past the underside of the flange member before entering the inlet end of the outlet duct.

* * * * *

UNITED STATES PATENT AND TRADEMARK OFFICE
CERTIFICATE OF CORRECTION

| | | |
|---|---|---|
| PATENT NO. | : 7,364,347 B2 | Page 1 of 1 |
| APPLICATION NO. | : 10/525773 | |
| DATED | : April 29, 2008 | |
| INVENTOR(S) | : Neville Ernest Lange et al. | |

It is certified that error appears in the above-identified patent and that said Letters Patent is hereby corrected as shown below:

Column 2, after line 7, insert the following paragraph:

--The outlet duct may surround the outlet end of the supply duct and may be substantially co-axial therewith.--

Column 8, line 62 (Claim 29), change "flow rate" to --flow rate of--.

Signed and Sealed this

Sixteenth Day of December, 2008

JON W. DUDAS
*Director of the United States Patent and Trademark Office*